United States Patent [19]

Kajikawa et al.

[11] Patent Number: 5,088,321
[45] Date of Patent: Feb. 18, 1992

[54] APPARATUS AND METHOD FOR OBSERVING THE GROUND CONTACT PATCH OF A TIRE

[75] Inventors: Akira Kajikawa; Kenji Saito, both of Kobe, Japan

[73] Assignee: Sumitomo Rubber Industries, Ltd., Hyogo, Japan

[21] Appl. No.: 603,561

[22] Filed: Oct. 26, 1990

[30] Foreign Application Priority Data

Nov. 2, 1989 [JP] Japan .................. 1-286098

[51] Int. Cl.$^5$ ............................. G01M 17/02
[52] U.S. Cl. ........................ 73/146; 356/71
[58] Field of Search ............... 73/146; 356/71

[56] References Cited

U.S. PATENT DOCUMENTS

| 3,865,488 | 2/1975 | Del Rio | 356/71 |
| 3,878,712 | 4/1975 | Chapin | 73/146 |
| 4,331,030 | 5/1982 | Webster | 73/146 |

FOREIGN PATENT DOCUMENTS 3411584 10/1985 Fed. Rep. of Germany ........ 73/146

OTHER PUBLICATIONS

Spinner, "An Apparatus for Determining the Actual Footprint Area of Tires", Material Research and Standards, vol. 10, No. 2, pp. 20–23, Feb. 1970.

Primary Examiner—Donald O. Woodiel
Attorney, Agent, or Firm—Birch, Stewart, Kolasch & Birch

[57] ABSTRACT

An apparatus and method in which light from source is kept within a transparent moving roadway and a tire tread is pressed onto one surface of the roadway. The ground contact patch of the tire is observed from the opposite side, and the ground contact area and the non-ground contact area of the tire tread is distinguished clearly. The dynamic behaviour of the ground contact patch of the rotating tire roadway can be observed by means of a camera unit. The information obtained can be utilized for tire design to improve tire performance.

10 Claims, 4 Drawing Sheets

APPARATUS AND METHOD FOR OBSERVING THE GROUND CONTACT PATCH OF A TIRE

BACKGROUND OF THE INVENTION

The present invention relates to an apparatus and a method for observing the ground contact patch of a tire.

In order to improve tire performance factors such as steering stability, vehicle fuel consumption and wear resistance, it is very important to be able to effectively analyze the ground contact patch of a running tire.

However, it is very hard to see directly and in detail the state of a ground contact patch of a running tire with conventional technology. It is particularly difficult with camber angle and/or slip angle applied to the tire.

The ground contact patch of a tire has been observed indirectly by painting the tire surface, with, for example black paint, and pressing the tire surface to transfer the ground contact patch pattern onto a drawing board.

With such a conventional method of observing ground contact patch of a tire by mean of a transfer, it is still impossible to obtain the ground contact patch pattern of a running tire applied with a slip angle and to observe siping behavior which only occurs when the tire is moving.

An object of the present invention is to provide an observation apparatus and method capable of directly and visually observing the dynamic behavior of the ground contact patch of a tire.

SUMMARY OF THE INVENTION

According the invention provides an apparatus for observing the ground contact patch of a tire characterized in that it comprises a moving roadway, comprising a transparent body, having a predetermined thickness, a light source arranged so that the light emitted therefrom is reflected within the transparent body, a tire press unit for pressing the outer circumference of a tire onto a surface of the moving roadway and a camera unit arranged so as to observe the resultant ground contact patch of the tire through the transparent moving roadway from the opposite side of the ground contact patch of the tire.

Further an apparatus for observing a ground contact patch of a tire of the present invention is characterized in that the moving roadway is straight and has enough length to allow a continuous observation of the tire tread during one rotation or more of the tire.

Alternatively the moving roadway may comprise a circular drum having an outer cylindrical surface including the transparent body upon which the tire can be run.

In either case the transparent body may comprise part or all of the moving roadway.

The light source is arranged so that the light emitted therefrom is reflected within the transparent body and does nor emerge from it. This is preferably achieved by means of supplying the light into the transparent body at an edge in the direction parallel to the tire supporting surface.

An embroadened feature of the apparatus is that the press unit comprises a tire load actuator, a camber actuator and a slip angle actuator each of which may be controlled by a pre-programmed machine such as a computer to allow the tire to be tested under various conditions of load, camber and slip angle.

The invention also provides a method for observing grounded tire tread characterized by painting a tire tread surface with a color capable of reflecting a light, projecting a light from a side face of a transparent body, so as to keep the light within the thickness of the transparent body, pressing the tire tread onto a surface of the transparent body, and observing the ground contact patch through the transparent body from another side opposite to the surface in contact with the tire.

Further a method for observing the ground contact patch of the present invention is characterized in that the ground contact patch is observed continuously during one rotation or more of the tire.

Still further the method preferably comprises applying to the tire a slip angle relative to the direction of rotation of the tire so that the ground contact patch can be observed with the tire in a stabilized condition with slip angle applied.

The observation or testing of tire tread with an apparatus according to the present invention is carried out by the following procedure.

First, a tire is mounted on the tire press unit and the outside circumference of the tire is pressed onto the moving roadway. Next the moving roadway is moved and this movement makes the tire rotate on the moving roadway.

Since the moving roadway comprises a transparent body, the ground contact patch of the tire can be observed by the camera unit arranged on the side opposite to the ground contact area on the moving roadway.

In order to make the contact patch visible sufficiently clearly a clear distinction between the ground contact area and the nonground contact area is provided in the present invention by keeping light, projected from a light source, within or inside the transparent body. Namely, light from the light source travels into the transparent body and remains in it without leaking out from the surface. However when this light reaches the ground contact area of the tire, the light reflects irregularly and then emerges toward the camera unit as an image. The refractive index at the interface between the transparent body and the air is different from the refractive index at the interface between the transparent body and the tire, and therefore, the light is kept within the transparent body by total reflection at the interface between the transparent body and the air, and eventually goes out toward the camera unit following irregular reflection at the interface between the transparent body and the tire. Consequently, the ground contact area and the nonground contact area of the tire are clearly distinguished, and the dynamic behavior of the ground contact patch of the tire such as the deformation state of the tread pattern block of the rotating tire due to contact with the moving roadway and the deformation state of the tread siping (narrow slits) due to contact with the moving roadway can be observed by means of the camera unit.

If the tire tread is painted with a bright color, the reflection from the interface becomes even clearer.

Embodiments will now be described by way of examples.

DETAILED DESCRIPTION

Figure 1:
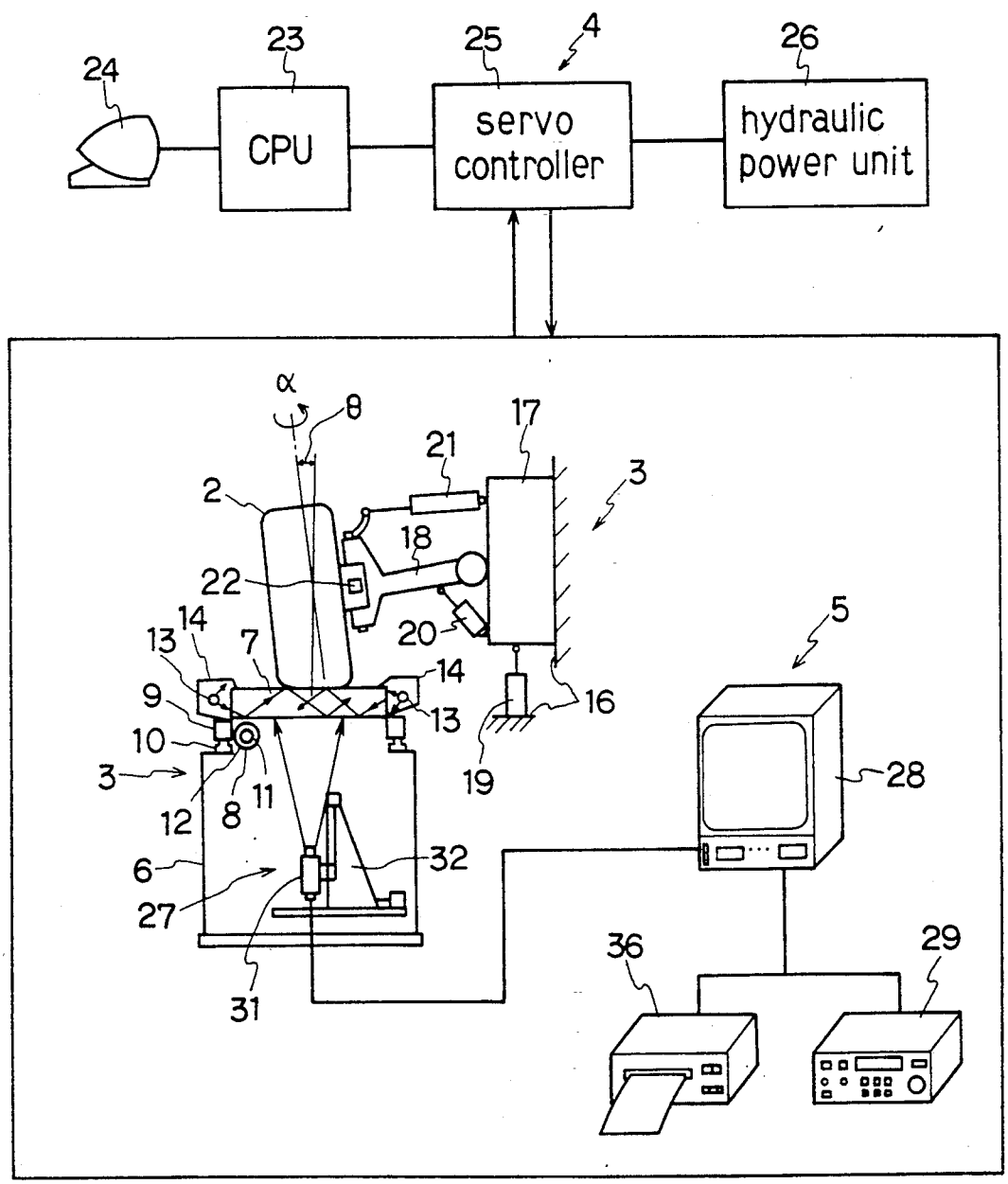
FIG. 1 is an explanatory view showing an embodiment of the apparatus according to the present invention.
Figure 2:
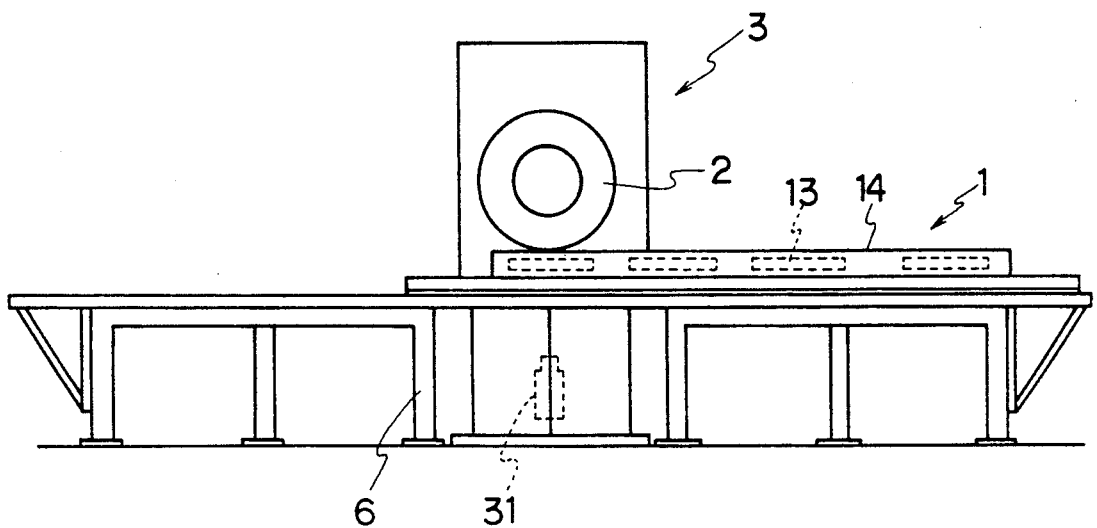
FIG. 2 is a front view of the apparatus of FIG. 1.

The apparatus for observing a ground contact patch of a tire according to the present invention comprises a moving roadway assembly 1; a tire press unit 3 for pressing a tire 2 onto the moving roadway assembly 1; a control unit 4 for driving and controlling the moving roadway assembly 1 and tire press unit 3; and an image pick-up and process unit 5 capable of processing a picture of a ground contact area.

The moving roadway assembly 1 comprises a support structure 6 fixed to a floor supporting a moving roadway 7 which is able to move back and forth in the horizontal direction. A driving unit 8 is provided to drive the moving roadway 7.

The moving roadway 7 is made of transparent glass having a predetermined thickness. The upper and lower surfaces of the glass are smooth and flat and are parallel to each other. In this embodiment, two sheets of glass plate are bonded, by an adhesive agent, to each other to form the moving roadway 7. The moving roadway 7 is supported at its edge by a frame 9 which is mounted on a guide rail 10 attached to the support structure 6 in such a manner that the roadway 7 can be moved back and forth in the horizontal direction. With respect to the length of the moving roadway 7, it is longer than the length corresponding to one rotation (the full outside circumferential length) of the tire to be observed. In this embodiment, the length of the moving roadway 7 is 3 m making it suitable for tires for passenger cars or light trucks.

The driving unit 8 comprises a feed screw 11 rotatably supported to the support structure 6; a nut 12 engaged with the feed screw 11 and fixed to the frame 9; and an hydraulic motor (not represented in the drawings) for driving the feed screw 11.

Light sources 13 are arranged at both the left and right sides of the moving roadway 7. These light sources 13 are attached to the frame 9 so that the light from the light sources 13 is kept within the thickness of the moving roadway 7 and does not leak out from the upper and lower surfaces of the moving roadway 7.

The light sources 13 are normally required to be able to supply a stable light within the transparent body. For this purpose, the light sources 13 may have a light emitting device having an effective length for light emitting longer than a predetermined length (in detail a flourescent lamp having an effective length for light emitting longer than 300 mm is preferable), or plural light sources may be used so that they have equal luminous energy levels and are placed at regular intervals.

Further, the light sources 13 have enough luminous energy levels to sufficiently carry out the observation of the reflected light from the ground contact patch.

Figure 3:
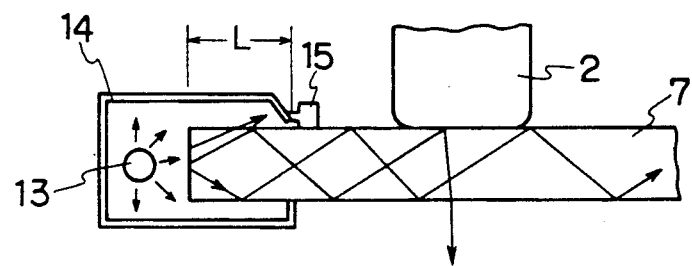
FIG. 3 is an enlarged view of a main part of the apparatus.

Covers 14 surround the light sources 13 and, as shown in FIG. 3, are designed so as to partially cover the upper and lower surfaces of the moving roadway by a predetermined length L measured from the side edge. Thus the light from the light sources 13 is completely kept within the moving roadway 7. At the edge of the cover 14, a douser 15 is arranged so that the light from the light sources 13 does not leak out through the gap between the cover 14 and the moving roadway 7.

The tire press unit 3 comprises a frame or mounting structure 16 fixed relatively to the floor; a slide 17 on the structure 16 so as to be freely movable upwards and downwards and a swing arm device 18 which is attached to the slide 17 and is capable of adjusting the camber angle $\theta$ and the slip angle $\alpha$ of the tire 2. The tire 2, assembled or a rim and inflated to its predetermined internal pressure, is removably attached to the swing arm device 18 and may be rotated about the axis of the tire and wheel assembly.

The tire press unit 3 and the moving roadway assembly 1 are relatively arranged so that the tire 2 contacts the upper surface of the moving roadway 7 and the rotational axis of the tire 2 is perpendicular to the direction of movement of the moving roadway 7.

A raising and lowering actuator 19 and a displacement detector (not represented in the drawing) are arranged between the lower supporting surface of the structure 16 and the slide 17 so that the vertical position of the slide 17 can be adjusted. Also a camber angle actuator 20 and a camber angle detector (not represented in the drawing) are provided and a slip angle actuator 21 and a slip angle detector (not represented in the drawing) between the slide 17 and the swinging arm device 18. Furthermore, a three-component load detector 22 is arranged at the load supporting part of the swinging arm device 18. In this embodiment, the actuators 19, 20 and 21 are hydraulic cylinders.

The control unit 4 comprises a computer 23, an input-output device 24, a servo controller 25 controlled by the computer 23 and a hydraulic power unit 26 for supplying the servo controller 25 with hydraulic pressure. Hydraulic pressure is supplied to the hydraulic motor and the various actuators 19, 20 and 21 through the servo controller 25. By using the servo controller 25 the camber angle and the slip angle are correctly controlled.

Further the control unit 4 is capable of automatically driving the moving roadway assembly 1 and the tire press unit 3 in accordance with a predetermined program by means of the computer 23. Thus, the computer program permits that a mode can be set optionally.

The image pick-up and process unit 5 comprises a camera unit 27 arranged below the moving roadway 7 and immediately under the tire 2 mounted on the tire press unit 3. A monitor 28 displays pictures taken by means of the camera unit 27 and there is a video tape recorder 29 and a video printer 30 for recording the pictures.

The camera unit 27 is an industrial video camera 31 on a mount 32 allowing camera movement upwards and downwards and left and right. The movement of the mount 32 is controlled by means of an hydraulic cylinder operated by fluid from the hydraulic power unit 26.

Next, the method for observing the ground contact patch employing the above-mentioned apparatus will be explained below.

The tread surface of the tire 2 is painted with a bright color, preferably white. Coloring compound, including rubber is preferably used to improve adhesion to the tire tread surface. Then the painted tire 2 is mounted on the tire press unit 3.

Figure 4:
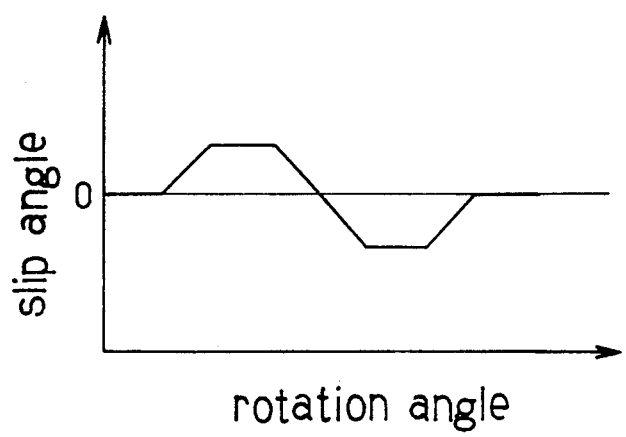
FIG. 4 is a graph showing control of slip angle relative to tire rotation angle.

The control unit 4 is programmed so as to carry out a test procedure and, consequently, the factors to be applied to the tire 2 such as vertical load, camber angle, slip angle, movement velocity of the moving roadway 7 and so on are automatically set. For example, the rotation angle and the slip angle are controlled as shown in FIG. 4. Namely, the control unit 4 is programmed so that the tire factors such as vertical load, camber angle and slip angle can be changed optionally during the movement of the moving roadway 7.

When a start switch is pushed, the tire press unit 3 and the moving roadway assembly 1 are automatically driven by means of the control unit 4. The slide 17 moves downwards controlled by the actuator 19 and consequently the tire 2 contacts the moving roadway 7 under the predetermined vertical load. The three-component load detector 22 measures this load for the sake of carrying out feedback control. The camber angle actuator 20 and the slip angle actuator 21 operate to apply the predetermined camber angle $\theta$ and slip angle $\alpha$ and then the moving roadway 7 is moved at the predetermined velocity.

At the camera unit 27, the position and the focal point of the mount 32 are adjusted so that the camera 31 views the ground contact patch of the tire 2.

As shown in FIG. 3, the light from the light source 13 is kept within the moving roadway 7. When the light reaches the interface between the ground contact patch and the moving roadway, it is reflected irregularly and emerges from the transparent body to the telecamera 31.

Figure 5:
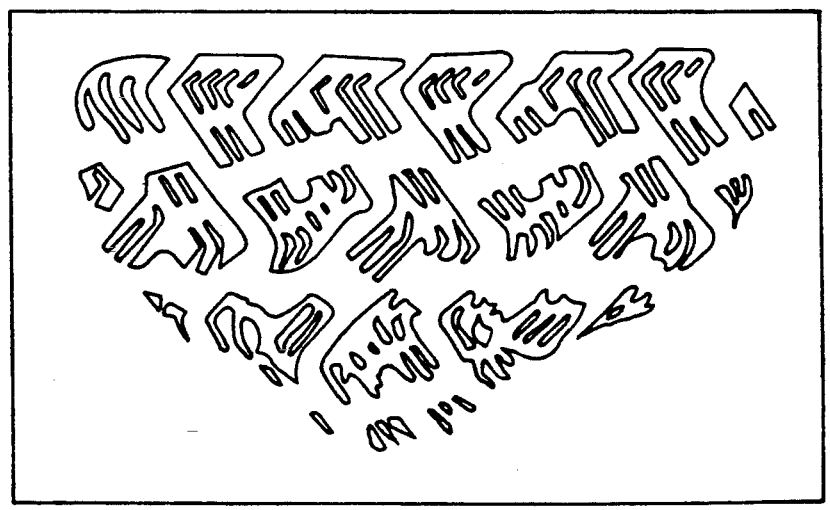
FIG. 5 is a picture of the geometric pattern of a ground contact patch of tire and FIG. 6 is a partially sectioned view showing another embodiment of the apparatus.

Consequently, only the ground contact patch of the tire tread is projected to the camera and can then be photographed clearly as shown in FIG. 5. Because the tire tread surface is painted with a bright color, the picture of the grounded tire tread is made clearer. This picture is displayed by means of the monitor 28 and is recorded by the video tape recorder 29 and then can be reproduced by the video printer 30.

In a manner like to the above-mentioned embodiment, dynamic changes of ground contact patch of a tire can be observed directly.

To do this, the apparatus of the present invention employs a construction in which the tire 2 is rotated by movement of the moving roadway 7 of the moving roadway assembly 1. Then the apparatus of the present invention can be more compact and will cause less vibration compared to the different arrangement in which the tire 2 is rotated by the movement of the tire press unit 3. Additionally the above-mentioned construction allows the camera 31 to be fixed and so the camera 31 is less influenced by vibration and resultant burring of the image. Consequently, a stable picture can be provided and the control of the load, the camber angle, the slip angle and so on can be carried out easily. Further because the camera 31 is set so as to be freely movable up-and-down, back-and-forth and left-and-right, the observation of ground contact patch of a tire is easily carried out by means of zoom and positional movement of the camera 31.

The moving roadway 7 has a length which is longer than the length corresponding to one full rotation (the outside circumference) of the tire to be observed. This provides a relaxation length sufficient for the ground contact shape to relax or settle before recording the image. The relaxation length is thus, for example, the necessary length so that the lateral force generated due to the application of a slip angle can reach stability state and the geometric shape of the ground contact patch thus becomes stable under the influence of the forces applied to the tire.

The information obtained through by the image pick-up process unit 5 is useful for tire designers to improve tire performance such as steering stability and wear resistance because the information can be analyzed both quantitatively and qualitatively.

The three-component load defector 22 detects vertical load, left-and-right load and back-and-forth load applied to the tire during the rotation of the tire under load, so the force and the configuration of the grounded tire tread can be analyzed together.

Further, a brake mechanism may be arranged to make it possible to analyze the above-mentioned forces and the state of deformation of the ground contact patch under the condition wherein a braking force is applied.

Figure 6:
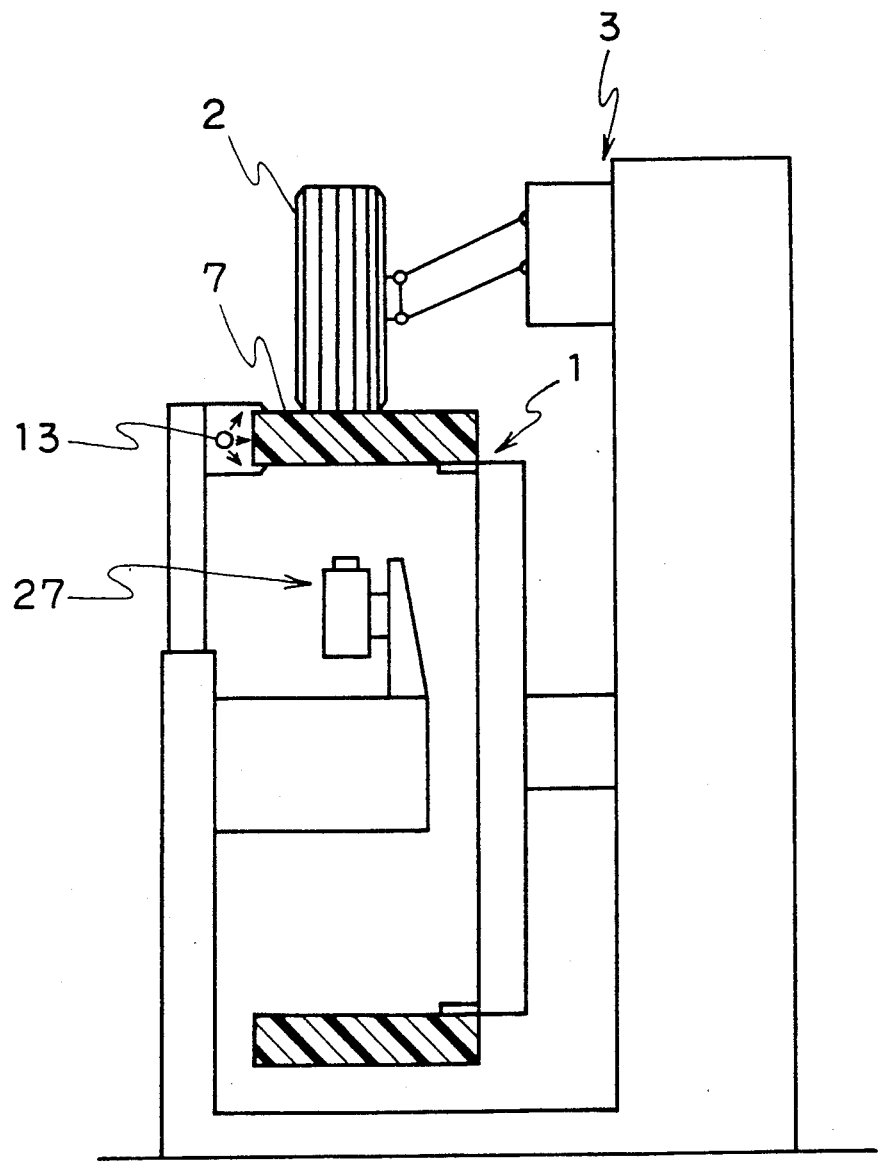

The apparatus shown in FIG. 6 is another embodiment of the present invention. In this embodiment the moving roadway 7 is of the drum-type. The whole drum may be formed of transparent moving roadway 7, or alternatively only a part of the drum may be formed of transparent moving roadway 7. In this case the transparent material is partly or even completely supported by a non-transparent material. The rotatable moving roadway assembly 1 of this type makes it possible to observe the ground contact patch under high speed rotation.

The details of load application and control are similar to the first embodiment.

The present invention is not limited to those embodiments. For example, the transparent body is not limited to a completely transparent body, and a colored transparent body may be used. Alternative light to normal white light may also be used to provide clear images.

Further, another observing method can be utilized by forming a water layer (0.5 to 30 mm thickness) of brightly colored aqueous solution (for example poster color) to cover the full length of the transparent moving roadway instead of coloring the tread surface, and then observing the ground contact patch from the opposite side of the interface between the transparent moving roadway and the tire tread. In this case, only the ground area of the tire tread shows black. This method is different from the above-mentioned embodiment, because it is possible to observe the ground contact patch under wet-conditions and pre-coloring of the tire tread is not required.

Using the present invention, the detailed shape of the ground contact patch of a tire can be observed dynamically, directly and visually. For example, the state of the ground contact of the tread pattern blocks and the effect of tread siping of the rotating tire can be observed for more than one full rotation of the tire. Further the information can be analyzed both quantitatively and qualitatively, by picture processing technology, to give a useful tool for tire design to improve tire performance.

A most important advantage of the apparatus is the ability to observe and record the contact patch with a steering force applied to the rotating tire.

What is claimed is:

1. An apparatus for observing the ground contact patch of a tire characterized by a moving road way, comprising a transparent body, having a predetermined thickness, a light source arranged so that the light emitted therefrom is reflected within the transparent body, a tire press unit for pressing the outer circumference of a tire onto a surface of the moving roadway and a camera unit arranged so as to observe the resultant ground contact patch of the tire through the transparent moving roadway from opposite the ground contact patch of the tire.

2. The apparatus of claim 1 chracterized in that the moving roadway is straight and has enough length so that the ground contact patch can be observed continuously for at least one full rotation of the tire.

3. The apparatus of claim 2 characterized in that the moving roadway comprises a circular drum having an outer cylindrical surface including the transparent body upon which a tire can be run.

4. The apparatus of claim 1, 2 or 3 characterized in that the transparent body comprises part of said moving roadway.

5. The apparatus of claim 1, 2 or 3 characterized in that the transparent body comprises all said moving roadway.

6. The apparatus of any of claims 1 characterized by the light source supplying light into the transparent body at an edge in the direction parallel to the tire supporting surface.

7. The apparatus of any of claims 1 characterized in that the tire press unit comprises a tire bead actuator, a camber actuator and a slip angle actuator.

8. A method for observing grounded contact patch of a tire using the apparatus of claim 1 characterized by painting a tire tread surface with a color capable of reflecting light, projecting light from a side face of a transparent body so that the light is reflected within the thickness of the transparent body, pressing the tire tread onto a surface of the transparent body, and observing the ground contact patch of the tire through the transparent body from opposite the ground contact patch of the tire.

9. A method of claim 8 characterized in that the ground contact patch is observed continuously during at least one full rotation of the tire.

10. The method of claim 8 characterized in that a slip angle is applied to the tire relative to the direction of rotation of the tire.

* * * * *